（12）United States Patent
Tauber et al.

(10) Patent No.: US 11,270,522 B1
(45) Date of Patent: Mar. 8, 2022

(54) SYSTEMS AND METHODS FOR FACILITATING DISPLAY OF AUGMENTED REALITY CONTENT

(71) Applicant: Verizon Patent and Licensing Inc., Basking Ridge, NJ (US)

(72) Inventors: Zachary Tauber, Hawthorne, CA (US); Herve Bizira, Inglewood, CA (US); Viktor Kyriazakos, Athens (GR); Christos Papapavlou, Patras (GR); Sean McCall, Brookfield, WI (US); Guy Dassa, Mamaroneck, NY (US); Jeffrey Scholz, Dallas, TX (US); Praveen Mareedu, Jersey City, NJ (US); Xingyue Zhou, Mountain View, CA (US); Haoxin Guo, Jersey City, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/008,042

(22) Filed: Aug. 31, 2020

(51) Int. Cl.
G06T 19/00 (2011.01)
G06T 19/20 (2011.01)
G06T 7/11 (2017.01)
G06K 9/00 (2022.01)

(52) U.S. Cl.
CPC .......... *G06T 19/20* (2013.01); *G06K 9/00671* (2013.01); *G06T 7/11* (2017.01); *G06T 19/006* (2013.01)

(58) Field of Classification Search
None
See application file for complete search history.

(56) References Cited

PUBLICATIONS

Skinner et al., "Localisation for Augmented Reality at Sport Events", 2019, IEEE. (Year: 2019).*
Lee et al., "A Vision-Based Mobile Augmented Reality System for Baseball Games", Springer-Verlag Berlin Heidelberg, 2011. (Year: 2011).*

* cited by examiner

*Primary Examiner* — Nicholas R Wilson

(57) ABSTRACT

An exemplary method includes an augmented reality system acquiring an image of an event from a viewpoint of a camera of a computing device in proximity to the event, the event including a performance area; identifying at least part of the performance area of the event within the image of the event; determining a three-dimensional (3D) pose of the performance area of the event within the image of the event; and providing, for concurrent display by a display device of the computing device, the image of the event and augmented reality content that is oriented according to the 3D pose of the performance area of the event within the image of the event.

19 Claims, 15 Drawing Sheets

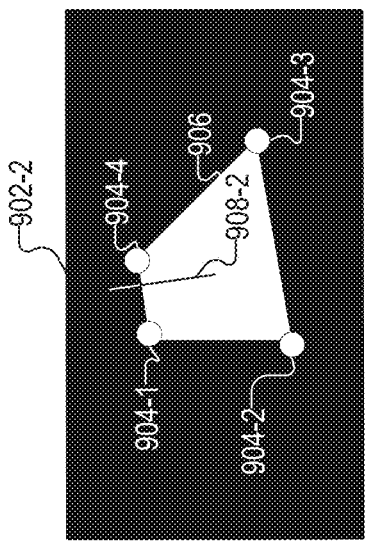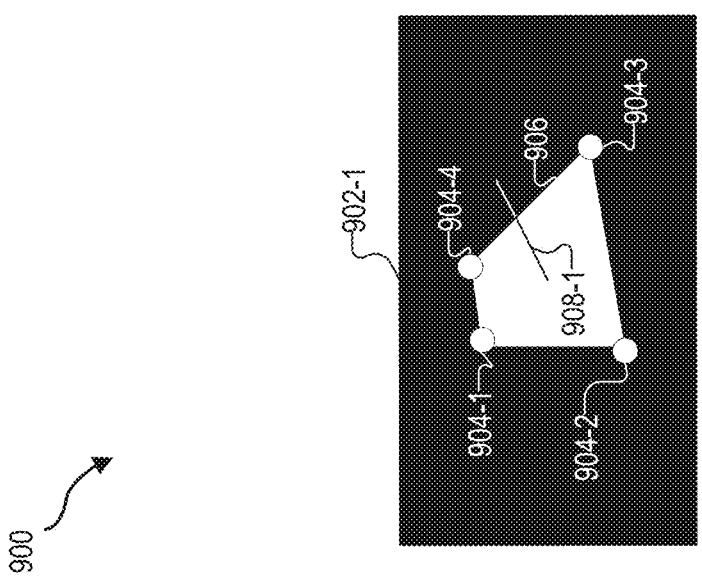
Fig. 9

SYSTEMS AND METHODS FOR FACILITATING DISPLAY OF AUGMENTED REALITY CONTENT

BACKGROUND INFORMATION

Advances in computing and networking technology have made new forms of media content available. For example, people may utilize mobile computing devices (e.g., smartphones, tablet computers, etc.) to experience augmented reality content that is provided for display together with an image of a real-world event.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 8-9 illustrate exemplary image processing operations according to principles described herein.

DETAILED DESCRIPTION OF PREFERRED EMBODIMENTS

Figure 1:
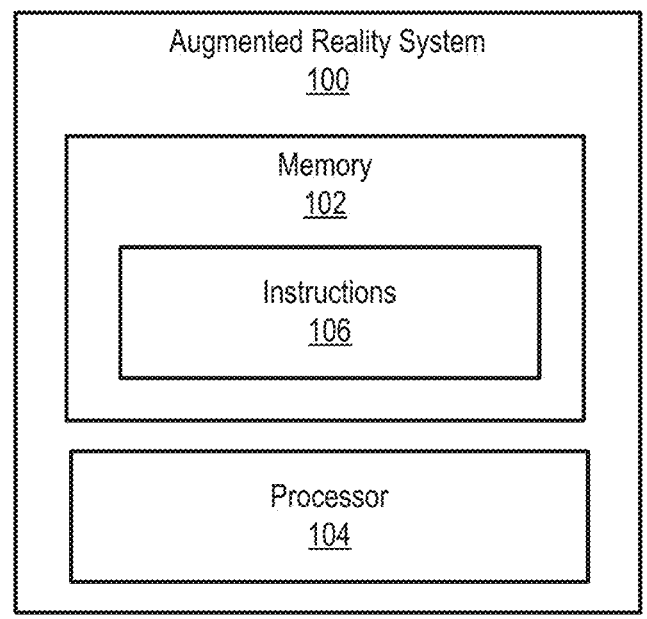
FIG. 1 illustrates an exemplary augmented reality system according to principles described herein.

Systems and methods for facilitating display of augmented reality content are described herein. For example, an exemplary augmented reality system may provide augmented reality content for display together with an image of a real-world event to enhance a user's experience of the real-world event.

In certain examples, for instance, an exemplary augmented reality system may acquire an image of an event from a viewpoint of a camera of a computing device in proximity to the event. The event may include a performance area (e.g., for participants in the event). The augmented reality system may identify at least part of the performance area of the event within the image of the event and determine a three-dimensional (3D) pose of the performance area of the event within the image of the event. The augmented reality system may then provide, for concurrent display by a display device of the computing device, the image of the event and augmented reality content that is oriented according to the 3D pose of the performance area of the event within the image of the event.

To illustrate an example, a user of a computing device (e.g., a smartphone, a tablet computer, etc.) may be viewing a live sporting event (e.g., a football game, a soccer match, etc.) from a distance in the stands of a stadium. While viewing the live sporting event, the user may hold up the computing device to use a camera of the computing device to capture a live image of a performance area (e.g., the football field, soccer field, etc.) of the live sporting event. While the user is viewing the live image on a display device of the computing device, the augmented reality system may analyze the live image in real-time in any suitable manner such as described herein to identify at least part of the performance area in the live image. The augmented reality system may then determine the 3D pose of the performance area. Based on the 3D pose of the performance area, the augmented reality system may provide, for concurrent display by the display device of the computing device, the live image of the live sporting event and augmented reality content (e.g., graphics, statistics, etc. associated with the live sporting event and/or one or more participants in the live sporting event) that is oriented according to the 3D pose of the performance area of the live sporting event within the live image of the live sporting event.

Various advantages and benefits are associated with the systems and methods for facilitating display of augmented reality content described herein. For example, systems and methods such as those described herein may provide a generalized approach that may be extended and/or scaled to use any type of performance area of an event as a canvas on which augmented reality content may be provided for display. The systems and methods such as those described herein overcome long-distance limitations of known augmented reality frameworks to successfully determine a 3D pose of a performance area and track a portion (e.g., a center of the field of play of a sporting event) of the performance area in real-time. In addition, systems and methods such as those described herein facilitate providing augmented reality content even when only a portion of the performance area is viewable and/or when the performance area is viewed from a variety of different vantage points (e.g., various angles, distances, heights, etc. with respect to the performance area). These and other benefits that may be provided by systems and methods described herein will be evident from the disclosure that follows.

FIG. 1 illustrates an exemplary augmented reality system 100 ("system 100"). As shown, system 100 may include, without limitation, a memory 102 and a processor 104 selectively and communicatively coupled to one another. Memory 102 and processor 104 may each include or be implemented by hardware and/or software components (e.g., processors, memories, communication interfaces, instructions stored in memory for execution by the processors, etc.). In some examples, memory 102 and/or processor 104 may be implemented by any suitable computing device. In other examples, memory 102 and/or processor 104 may be distributed between multiple devices and/or multiple locations as may serve a particular implementation. An illustrative implementation of system 100 is described herein.

Memory 102 may maintain (e.g., store) executable data used by processor 104 to perform any of the operations described herein. For example, memory 102 may store instructions 106 that may be executed by processor 104 to perform any of the operations described herein. Instructions 106 may be implemented by any suitable application, software, code, and/or other executable data instance.

Memory 102 may also maintain any data received, generated, managed, used, and/or transmitted by processor 104. Memory 102 may store any other suitable data as may serve a particular implementation. For example, memory 102 may store data representative of different types of events (e.g., sporting events, concerts, etc.), data indicative of dimensions (e.g., length, width, shape, etc.) and/or any other attribute of performance areas (e.g., playing fields, sport courts, performance stages, etc.) associated with the events, data (e.g., statistics, pictures, history, etc.) associated with participants (e.g., athletes, performers, etc.) of the events, data indicative of known outer contour shapes and/or 3D poses of performance areas of events, and/or any other suitable data. In addition, memory 102 may also store any suitable data associated with graphical user interface content, and/or any other suitable data that may be used to provide augmented reality content for display to a user.

Processor 104 may be configured to perform (e.g., execute instructions 106 stored in memory 102 to perform) various processing operations associated with facilitating display of augmented reality content. For example, processor 104 may determine a three-dimensional (3D) pose of a performance area of an event within an image of the event. Processor 104 may provide, for concurrent display by a display device of a computing device, the image of the event and augmented reality content that is oriented according to the 3D pose of the performance area of the event within the image of the event. These and other operations that may be performed by processor 104 are described herein.

System 100 (e.g., processor 104) may be configured to provide any suitable service and/or feature that may be associated with augmented reality content as may serve a particular implementation. For example, system 100 may be configured to provide participant information, provide user interfaces configured to facilitate user selection of augmented reality content, distribute (e.g., stream) augmented reality content for consumption by users of computing devices (e.g., smartphones, tablet computers, etc.), and/or provide any other suitable service and/or feature that may provide information regarding and/or access to augmented reality content.

As used herein, the term "augmented reality content" may refer to any form of media that may be provided for display with an image of an event and/or distributed by system 100 and experienced by a user of system 100. Augmented reality content may be provided for concurrent display with an image of an event in any suitable manner. For example, augmented reality content may be provided for display as an overlay over the image. Alternatively, augmented reality content may be incorporated into the image in any suitable manner. Examples of augmented reality content are described herein.

Figure 2:
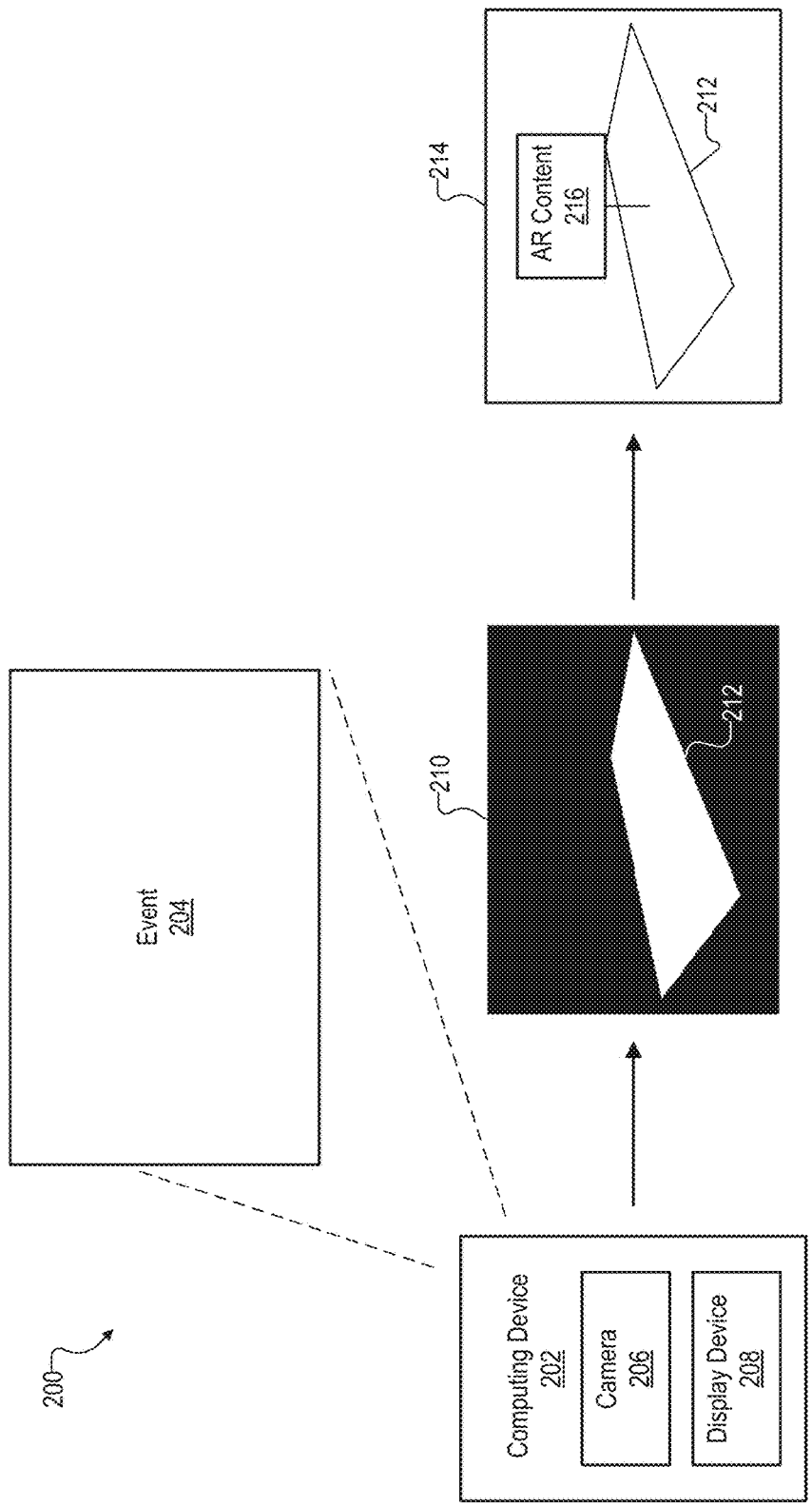
FIG. 2 illustrates an exemplary implementation of the augmented reality system of FIG. 1 according to principles described herein.

FIG. 2 shows an exemplary implementation 200 in which system 100 may be provided in certain examples. As shown in FIG. 2, implementation 200 includes a computing device 202 that is configured to capture an image of an event 204 from a viewpoint in proximity to event 204. To that end, computing device 202 includes a camera 206. Computing device 202 also includes a display device 208 configured to display an image captured by camera 206. Computing device 202 may correspond to any suitable mobile computing device that may be associated with a user. For example, computing device 202 may correspond to a smartphone, a head mounted display device, a tablet computer, and/or any other suitable device.

Event 204 may correspond to any suitable type of event that includes a performance area. In certain examples, a performance area may be for participants in the event. For example, in certain implementations event 204 may correspond to a sporting event such as a football game, a soccer match, a basketball game, a baseball game, a tennis match, etc. In certain alternative implementations, event 204 may correspond to a concert, a political rally, a conference, etc.

In certain examples, event 204 may correspond to a live event in which a user of computing device 204 is physically located at event 204 (e.g., in the stands) and is viewing event 204 in real-time. In certain alternative implementations, event 204 may correspond to an event that a user of computing device 202 may experience while not being physically located at event 204. For example, the user may experience event 204 by viewing a display screen of an additional computing device (e.g., a television, a projector screen, etc.) that is displaying an image of event 204. In such examples, the additional computing device may display either a live image of event 204 or a recorded image of event 204.

As used herein, a "performance area" refers to a region having known dimensions and that is associated with an event (e.g., that is configured to be used by one or more participants in the event). The known dimensions of a performance area may include any suitable spatial attribute or combination of spatial attributes of the performance area as may serve a particular implementation. In certain examples, the known dimensions may include a known size (e.g., length, width, etc.) of the performance area. Additionally or alternatively, the known dimensions may include a known shape (e.g., rectangular, square, circular, oval, an irregular shape, etc.) of the performance area. In certain examples, a performance area may have a generally planar surface. For example, a performance area associated with a basketball game may be considered as having a generally planar surface. In certain alternative examples, a performance area may include convex portions, concave portions, angled portions, and/or planar portions in any suitable combination. For example, a performance area associated with a baseball game may have a combination of convex surfaces (e.g., a pitching mound) and planar surfaces (e.g., infield areas, outfield grass areas, etc.).

In certain examples, a performance area of an event may correspond to an area of play of a sporting event where athletes and/or other individuals participate in the sporting event. For example, an area of play may correspond to a football field, a soccer field, a basketball court, a baseball field, a tennis court, etc. In certain alternative examples, the performance area may correspond to a stage for participants (e.g., performers, speakers, etc.) of events such as concerts, conferences, political rallies, etc.

As described herein, system 100 may use known dimensions of a performance area to facilitate using the performance area as a canvas for augmented reality content. For example, while a user of computing device 202 is experiencing event 204, system 100 may acquire an image of event 204. System 100 may acquire the image of event 204 in any suitable manner. For example, a user of computing device 202 may direct camera 206 towards event 204 to capture an image of event 204 and system 100 may acquire data representative of the captured image from camera 206. Accordingly, system 100 may acquire the image of event 204 from a viewpoint of camera 206 of computing device 202.

Camera 206 may be configured to capture any suitable type of image of event 204 as may serve a particular implementation. For example, camera 206 may be configured to capture a still image, a live video image, and/or any other suitable type of image of event 204. Additionally or alternatively, camera 206 may be configured to capture a depth image of event 204. In certain implementations, such a depth image may be used by system 100 in any suitable manner to create a 3D point cloud of the performance area.

Display device 208 may be configured to display the image of event 204 in real-time as the image is captured by camera 206. Display device 208 may be implemented in any suitable manner. For example, in implementations where computing device 202 corresponds to a smartphone, display device 208 may correspond to a display screen of the smartphone. In certain alternative implementations where computing device 202 corresponds to a head mounted display device, display device 208 may correspond to a see through lens configured to direct an image to one or more eyes of a user while allowing the user to view the environment external to the head mounted display device.

After system 100 acquires the image of event 204, system 100 may identify at least part of a performance area within the image of event 204. System 100 may identify at least part of a performance area of event 204 within the image of event 204 in any suitable manner. For example, system 100 may perform one or more image processing operations on the image captured by camera 206 to determine that a region included in the image of event 204 represents a performance area. In certain examples, such image processing operations may include system 100 determining that the region included in the image of event 204 represents a performance area based on an average color of pixels included in the region. For example, if event 204 corresponds to a soccer match, system 100 may identify a region of the image as corresponding to the soccer field based on an average color of the pixels in the region being green.

In certain examples, such image processing operations may include system 100 determining an outer contour shape of the performance area. In certain examples, system 100 may identify a performance area by comparing an outer contour shape of the performance area in the image to a plurality of known outer contour shapes of performance areas. In such examples, system 100 may determine that the outer contour shape corresponds to a known outer contour shape from the plurality of known outer contour shapes when a degree of similarity between the outer contour shape and the known outer contour shape satisfies a predefined threshold. For example, system 100 may determine that the outer contour shape corresponds to a known outer contour shape when the degree of similarity between the outer contour shape and the known outer contour shape is above 75%, 80%, 90%, or 95%.

In certain examples, system 100 may use object segmentation and/or deep learning technology to identify a portion of an image that corresponds to performance area 212. For example, system 100 may use a supervised machine learning algorithm to generate a database of candidate outer contour shapes. In such examples, the training inputs to the supervised machine learning algorithm may include a plurality of images of an event that include labeled x and y coordinates of visible corners of performance areas. This facilitates marking corners of the performance area so as to define boundaries of the performance area as the ground truth. In addition, one or more images of the plurality of images may include labeled x and y coordinates of intersections of borders of a performance area and edges of the images. System 100 may use the supervised machine learning algorithm in any suitable manner during a training phase to analyze the candidate outer contour shapes with the labeled corners. After the training phase, system 100 may obtain, as an operational input, an image of an event in which a performance area is located. System 100 may use the supervised machine learning algorithm in any suitable manner (e.g., by using a deep neural network) to analyze the image of the event including the performance area and determine an outer contour shape for the performance area.

To illustrate an example, when event 204 corresponds to a football game, a deep neural network model may be trained with videos of a football stadium (e.g., during real football games and/or at any other suitable time). In such an example, the training set for the deep neural network model may include videos from multiple different viewing locations inside the stadium (e.g., from various viewpoints at various locations in the stands of the stadium). System 100 may use the videos in any suitable manner to generate the database of candidate outer contour shapes.

As shown in FIG. 2, a processed image 210 is shown in which a performance area 212 is depicted in relation to other portions of processed image 210. In the example shown in FIG. 2, the outer contour shape of performance area 212 may be considered as the boundary between performance area 212 and the black portions of processed image 210 that surround performance area 212. Processed image 210 may also be referred to as a mask of performance area 212 in certain implementations.

Performance area 212 is depicted as a convex quadrilateral in the example shown in FIG. 2. However, performance area 212 may have any other suitable shape in certain alternative implementations. For example, performance area 212 may have the shape of a baseball diamond in implementations where event 204 corresponds to a baseball game.

In certain examples, system 100 may determine, based on an outer contour shape of a performance area, that the performance area of an event is completely viewable within an image of the event. For example, as shown in FIG. 2, performance area 212 may be considered as being completely viewable within the image of event 204. In such examples, system 100 may perform any suitable image processing operations to determine a location of corners of performance area 212 that are viewable within processed image 210.

In certain alternative examples, at least a portion of a performance area may not be currently viewable within an image of an event. For example, one or more corners or other portions of a performance area may not be currently viewable within the image of the event. In such examples, system 100 may determine, based on the outer contour shape, a location where the performance area crosses a boundary of the image of the event. System 100 may then infer, based on the location where the performance area crosses the boundary, a location of the one or more corners of the performance area that are not currently viewable within the image of the event. In certain examples, system 100 may additionally or alternatively access information (e.g., from memory 102) indicating the dimensions (e.g., shape, size, etc.) of the performance area to facilitate determining the location of the one or more corners of the performance area that are not currently viewable within the image of the event.

In certain alternative examples, system 100 may determine, based on an outer contour shape of a performance area, that each corner of the performance area is outside of an image of an event. For example, the performance area may have the shape of a convex quadrilateral similar to what is shown in FIG. 2. However, an additional image of the sporting event may only include a view of the middle of the field such that each of the four corners of the convex quadrilateral are not currently viewable in the additional image of the event. In such examples, system 100 may access the known dimensions (e.g., from memory 102) of the performance area to facilitate system 100 identifying at least part of the performance area in the additional image of the event.

To facilitate determining where to provide augmented reality content within an image of an event, system 100 may determine a 3D pose of a performance area of an event within an image of the event. As used herein, the "3D pose" of a performance area refers to the combination of the orientation of the performance area and the position of the performance area in 3D space. System 100 may determine the 3D pose of a performance area in any suitable manner. For example, system 100 may determine in any suitable manner the x and y coordinates of each of the corners of performance area 212 shown in FIG. 2. Based on the x and y coordinates of the corners, system 100 may determine the 3D pose of performance area 212 within the image of event 204.

In examples where an outer contour shape of a performance area is completely viewable within an image of an event, system 100 may determine the 3D pose of the performance area based on the outer contour shape indicating that the performance area is completely viewable within the image of the event.

In examples where a portion of a performance area is not currently viewable within an image of an event, system 100 may determine the 3D pose of the performance area based on the outer contour shape and a determined location of the portion (e.g., a corner) that is not currently within the image of the event.

In certain implementations, system 100 may determine the 3D pose by determining 3D locations of corners of a performance area. For example, in implementations where the performance area has four corners, as shown in processed image 210, system 100 may determine the x and y coordinates of each of the four corners. After system 100 determines the x and y coordinates of each of the corners, system 100 may create a camera matrix based on the following expression 1):

camera_matrix=np.array([[focal_length,0,center[0]],
[0,focal_length,center[1]],[0,0,1]],
dtype="double")   1)

In expression 1), "center" is the center of the image.

System 100 may then create the four corresponding 3D points in a certain order (e.g., counterclockwise from the upper right corner). The following expression 2) is an exemplary expression for each of the four corners of the performance area.

model_points=np.array([(600.0,260.0,0.0),#upper
right(-600.0,260.0,0.0),#upper left(-600.0,-
260.0,0.0),#lower left(600.0,-260.0,0.0)#lower
right])   2)

Based on expressions 1) and 2) system 100 may determine the 3D pose of performance area 212 in relation to the viewpoint from camera 206. Based on the determined 3D pose, system 100 may provide, for concurrent display by display device 208, an image of event 204 and augmented reality content that is oriented according to the 3D pose of performance area 212. To illustrate, FIG. 2 shows an image 214 of event 204 that includes augmented reality content 216 that is oriented according to the 3D pose of performance area 212. Augmented reality content 216 may be oriented according to the 3D pose of performance area 212 in any suitable manner. For example, system 100 may determine, based on the 3D pose of performance area 212, an anchor vector for augmented reality content. Such an anchor vector may be configured to intersect a surface of performance area 212 and extend perpendicularly with respect to the surface. In such examples, augmented reality content 216 may be provided for display along the anchor vector.

In the example shown in FIG. 2, augmented reality content 216 is provided for display at a center of performance area 212. Accordingly, in certain examples, system 100 may be configured to determine a center of performance area 212. This may be accomplished in any suitable manner. For example, system 100 may determine the center of performance area 212 based on the 3D positions of each of the corners of performance area 212. In certain examples, system 100 may be configured to track the center of the performance area in real-time. In certain alternative implementations, augmented reality content 216 may be provided for display within image 214 at a portion of performance area 212 other than the center of performance area 212.

In certain examples, an orientation of augmented reality content may be fixed in relation to a performance area of an event regardless of a change in viewing angle of a camera of a computing device. For example, augmented reality content 216 may be fixed at the location shown in FIG. 2 relative to performance area 212. As such, even if the user pans camera 206 to the left, to the right, up, or down, the position of augmented reality content 216 stays at a same position relative to performance area 216.

In certain examples, system 100 may provide a notification to a user of a computing device to inform the user that augmented reality content associated with an event is available. System 100 may provide such a notification in any suitable manner. For example, system 100 may provide a text notification to a user by way of display screen 208 of computing device 202. The notification may instruct the user to hold up computing device 202 so as to capture an image of performance area 212 with camera 206 of computing device 202.

Additionally or alternatively, in certain examples, system 100 may provide one or more graphical user interfaces for display by way of computing device 202 that facilitates accessing augmented reality content. Such graphical user interfaces may include a plurality of options that are selectable by the user of computing device 202 to experience different available augmented reality content. For example, if event 204 corresponds to a football game, the plurality of options may include one or more options to view augmented reality content associated with a big play that occurred (e.g., a fumble, an interception, a touchdown, etc.), players by position (e.g., quarterback, wide receiver, running back, etc.), and/or any other suitable option. System 100 may detect a user selection of one of the plurality of options and may provide augmented reality content associated with the selected option for display together with the image of the football field. For example, system 100 may detect a user selection of an option to experience augmented reality content associated with the top running back in the football game. In such an example, the augmented reality content may include, for example, an image of the top running back, statistics (e.g., rushing yards) associated with the top running back, team graphics, and/or any other suitable information.

Figure 3:
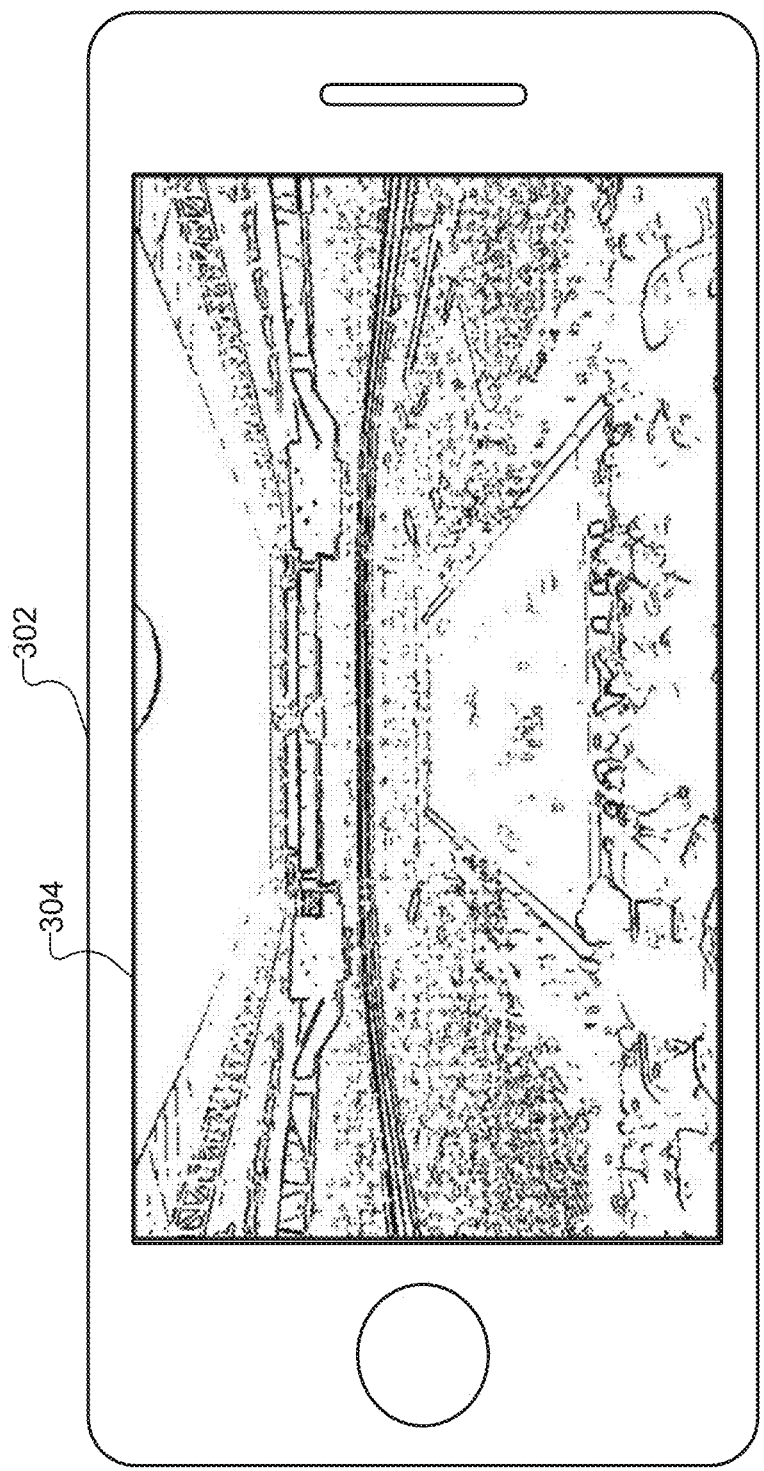
FIG. 3 illustrates an exemplary image of an event according to principles described herein.

FIG. 3 shows an implementation in which computing device 202 is implemented as a smartphone 302 that that is being used to capture an image of a football game. As shown in FIG. 3, smartphone 302 includes a display screen that is currently displaying a live image 304 of the football game. In the example shown in FIG. 3, live image 304 is captured by a camera of smartphone 302 while a user of smartphone 302, who may be in the stands of the stadium where the football game is being played, holds up smartphone 302 towards the football field.

Figure 4:
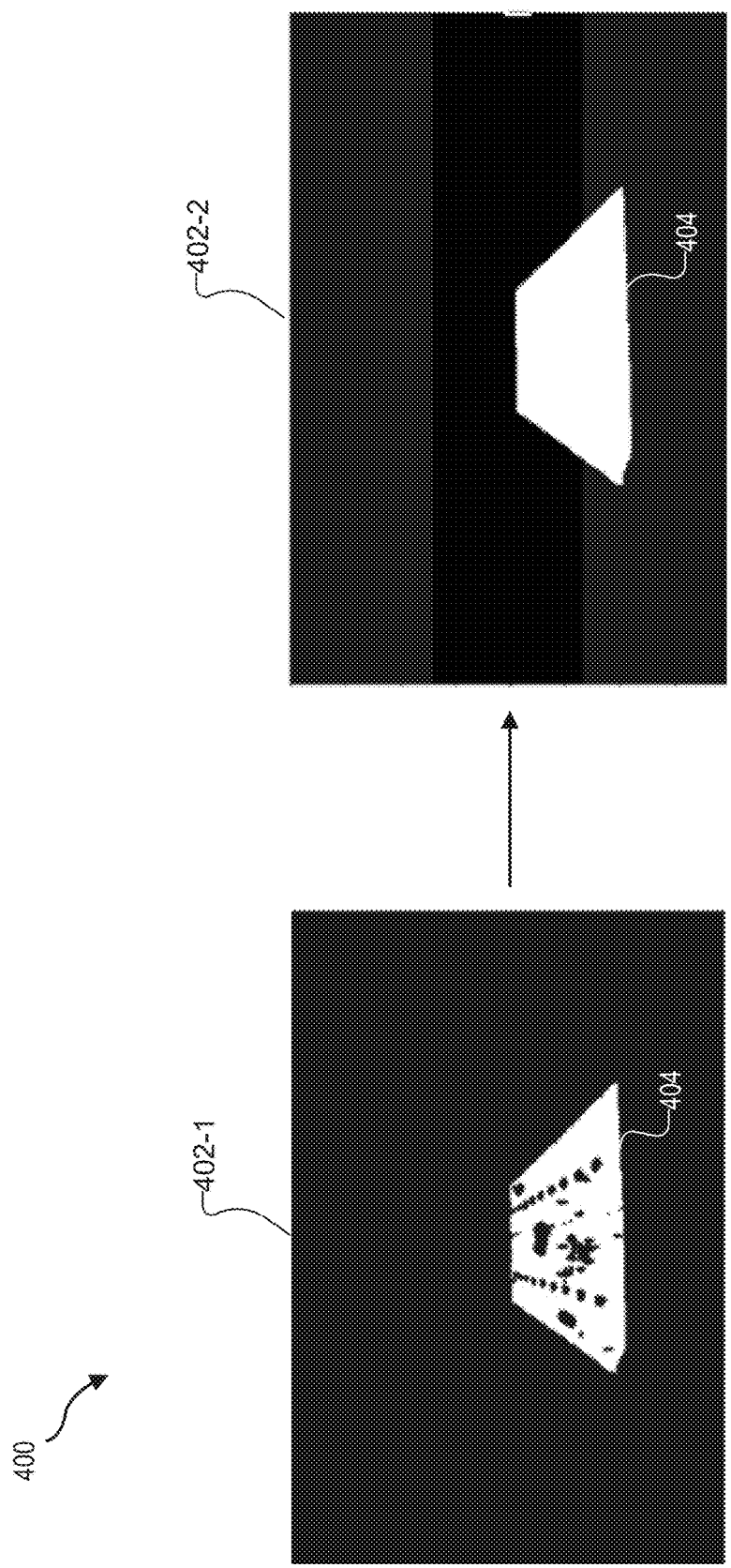
FIGS. 4-5 illustrate exemplary image processing operations according to principles described herein.

System 100 may analyze live image 304 to determine which region in live image 304 corresponds to the football field and which region of live image 304 corresponds to something (e.g., stands, spectators, etc.) other than the football field. This may be accomplished in any suitable manner using any suitable image processing technique. For example, system 100 may perform any suitable image processing operations to identify portions of live image 304 that correspond to the football field and other portions of live image 304 that correspond to regions of live image 304 other than the football field. In certain examples, system 100 may generate one or more processed images in which portions (e.g., pixels) that represent the football field are white and portions (e.g., pixels) that do not represent the football field are black. To illustrate, FIG. 4 shows exemplary implementation 400 depicting processed images 402 (e.g., processed images 402-1 and 402-2) that system 100 may generate while identifying the football field. As shown in FIG. 4, processed image 402-1 includes a performance area 404 that is white and that represents the football field. Processed image 402-1 also includes black splotches within performance area 404 that may be filled in, in any suitable manner, by system 100 to generate processed image 402-2. Processed images 402 are provided for illustrative purposes only. It is understood that various other intermediate processing operations may be performed by system 100 prior to achieving processed image 402-2. In addition, it is understood that processed images 402 may represent background processing performed by system 100. As such, system 100 may not provide processed images 402 for display to a user on the display screen of smartphone 302.

Figure 5:
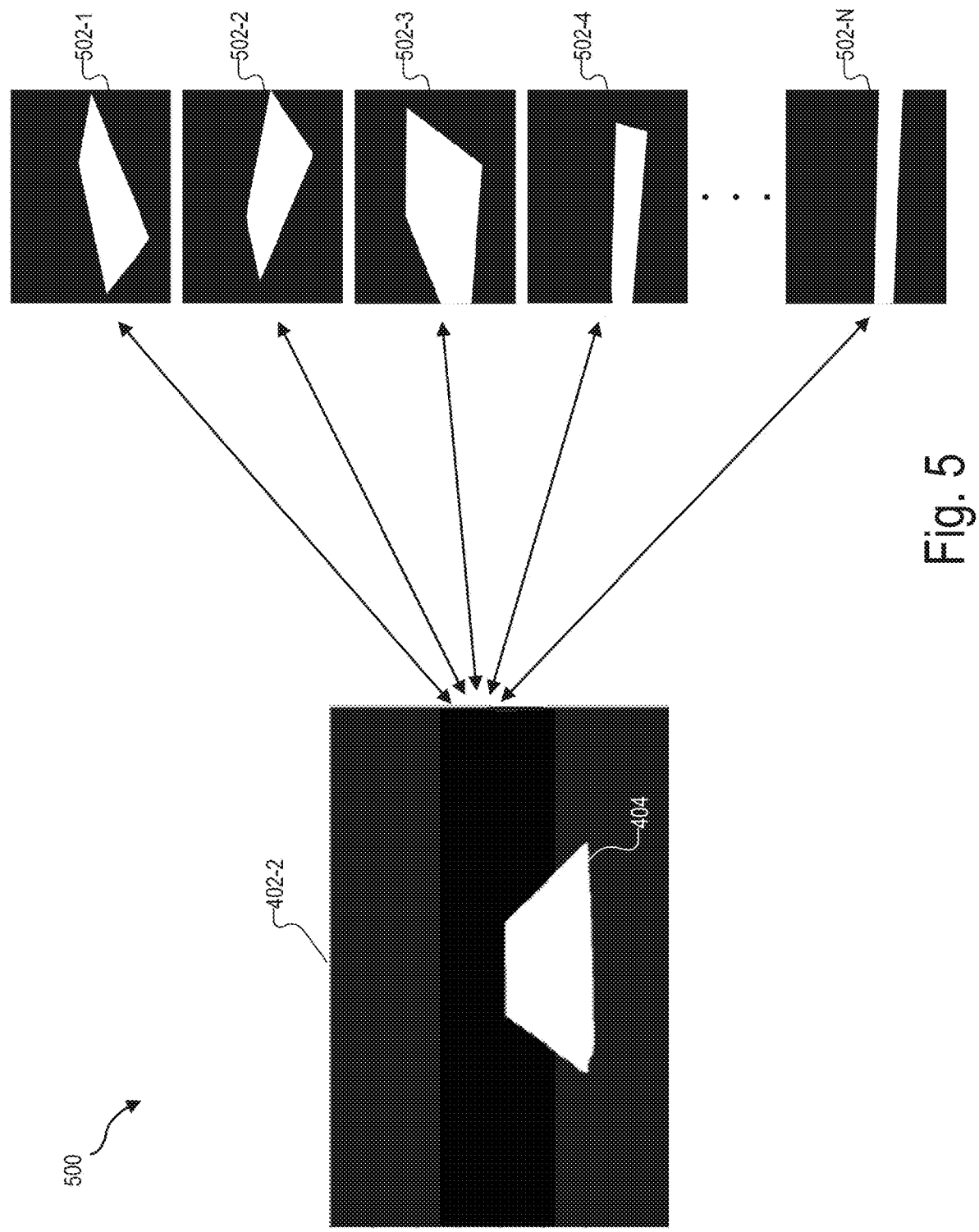

System 100 may use processed image 402-2 in any suitable manner to identify whether at least part of performance area 404 is within live image 304. For example, system 100 may determine an outer contour shape of performance area 404. In certain implementations, system 100 may compare the outer contour shape of processed area 404 in processed image 402-2 to a plurality of known outer contour shapes. To illustrate, FIG. 5 shows an implementation 500 that depicts a comparison between a processed image of an event and a plurality of known outer contour shapes 502 (e.g., known outer contour shapes 502-1 through 502-N). Known outer contour shapes 502 may represent views of the football stadium from different viewpoints of the football field. Known outer contour shapes 502 may be considered as masks that are encoded by system 100 as binary images where black (0) represents a region that does not include a performance area and white (255) represents a region that includes a performance area. System 100 may compare the outer contour shape of performance area 404 in processed image 402-2 to known outer contour shapes 502 in any suitable manner, such as described herein, to determine whether the football field is within live image 304.

Based on an outer contour shape of performance area 404 shown in processed image 402-2, system 100 may determine x and y locations of each of the corners of performance area 404. System 100 may then use the x and y locations of each of the corners to determine 3D positions of the corners of performance area 404 in relation to computing device 302. Based on the 3D positions of the corners, system 100 may then determine a center of performance area and an anchor vector that extends perpendicularly from a surface of performance area 404. System 100 may then provide augmented reality content for display together with the image of the football game oriented along the anchor vector in any suitable manner.

Figure 6:
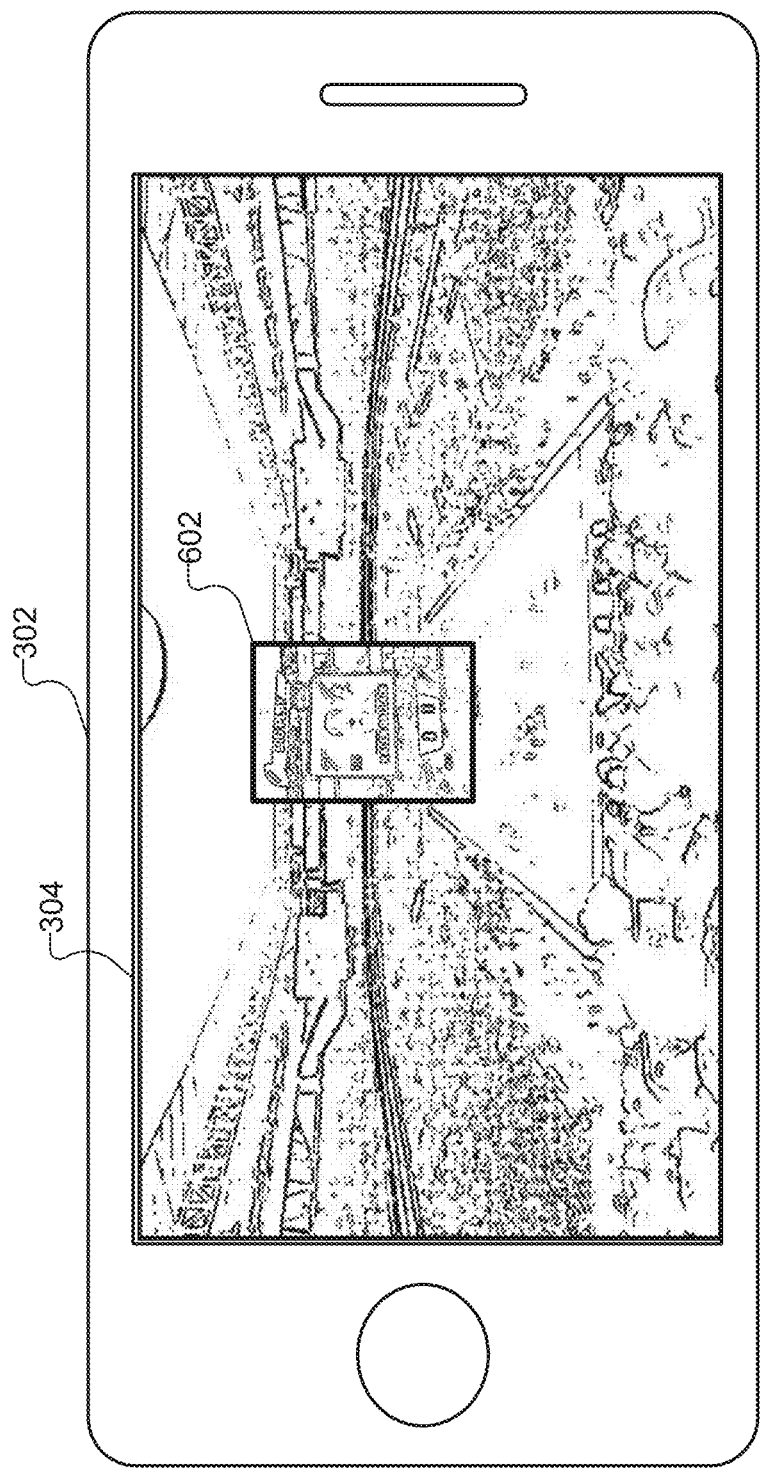
FIG. 6 illustrates an exemplary image of an event that includes augmented reality content according to principles described herein.

To illustrate, FIG. 6 shows exemplary augmented reality content 602 that may be provided for display by system 100 together with the image of the football game shown in FIG. 3. Augmented reality content 602 may include any suitable information and/or graphic associated with the football game. For example, augmented reality content 602 may include an image of a player in the football game, information indicating a score of the football game, team graphics, and/or any other suitable information.

Figure 7:
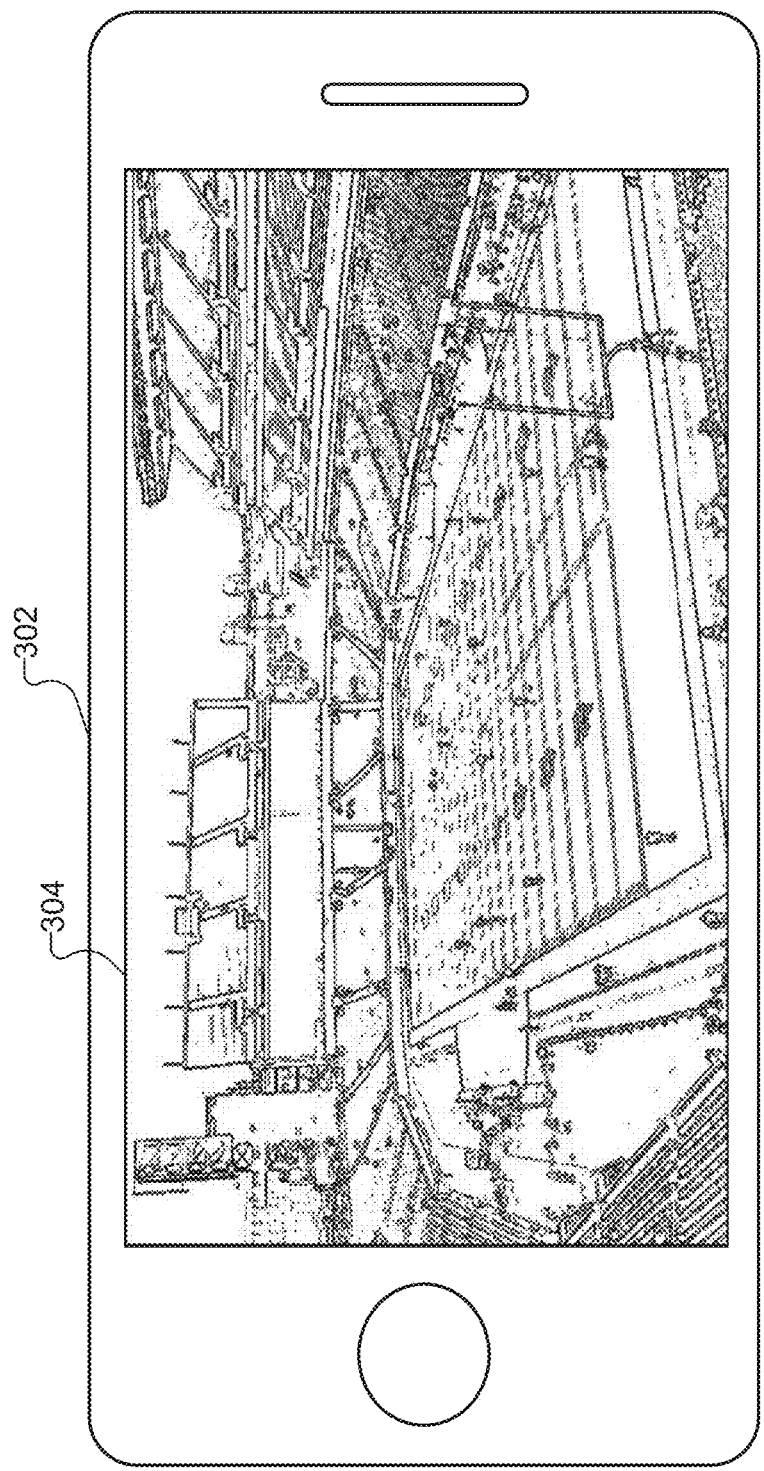
FIG. 7 illustrates another exemplary image of an event according to principles described herein.

FIG. 7 shows another implementation in which computing device 202 is implemented as a smartphone 302 that is being used to capture an image of a football game. As shown in FIG. 7, smartphone 302 includes a display screen that is currently displaying a live image 304 of the football game. In the example shown in FIG. 7, live image 304 is captured by a camera of smartphone 302 while the user, who may be in the stands of the stadium where the football game is being played, holds up smartphone 302 towards the football field.

Figure 8:
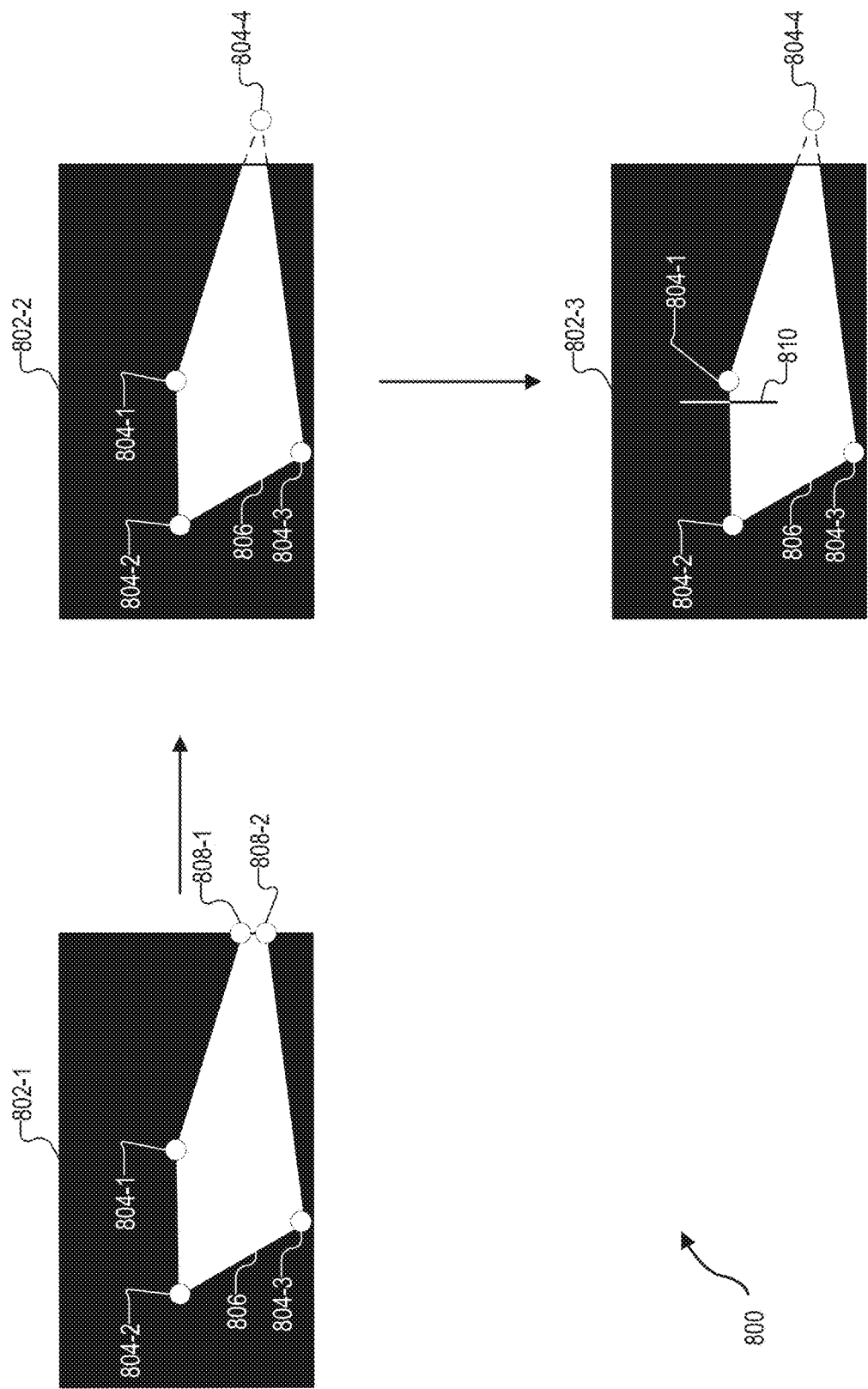

Unlike the example shown in FIG. 3, in the example shown in FIG. 7, the entire football field is not completely viewable within live image 304 displayed by smartphone 302. In particular, the bottom right corner of the football field crosses a border of live image 304 and is not currently displayed. In such an example, system 100 may be configured to determine an x and a y position of each of the visible corners of the football field as well as locations where the football field crosses the border of live image 304. System 100 may then generate various processed images to infer the location of the missing corner based on the locations where the football field crosses the border and/or any other suitable information associated with the football field. To illustrate, FIG. 8 shows an exemplary implementation 800 in which processed images 802 (e.g., processed images 802-1 through 802-3) may be generated by system 100. In the example shown in FIG. 8, corners 804-1, 804-2, and 804-3 of performance area 806 are within processed image 802-1. However, the bottom right corner is not. To determine the location of the missing corner, system 100 may determine intersection locations 808-1 and 808-2 where performance area crosses the border of image 802-1. System 100 may then infer the location of corner 804-4 in any suitable manner. For example, system 100 may extrapolate the location of corner 804-4 based on locations 808-1 and 808-2 (e.g., by extending the line that connects corner 804-1 and intersection location 808-1 beyond intersection location 808-1, extending the line that connects corner 804-3 and intersection location 808-2 beyond intersection location 808-1, and finding and setting the location at which the extended lines intersect to be the missing corner). Additionally or alternatively, system 100 may infer the location of corner 804-4 based on the known dimensions of the football field. Based on corners 804-1 through 804-4, system 100 may determine the 3D pose of performance area 806 and a center of performance area 806 in any suitable manner. For example, system 100 may use, in any suitable manner, 3D locations of each corner of the football field to find a center of the football field and a surface normal vector extending from the center of the football field. As shown in FIG. 8, an anchor vector 810 extends from the center of performance area 806 and is oriented perpendicular to the surface of performance area 806. Anchor vector 810 may be used by system 100 to orient augmented reality content with respect the surface of performance area 806 such as described herein.

In certain examples, system 100 may determine that two or more 3D poses may be candidates for being determined as a 3D pose for a performance area. For example, system 100 may determine that a first 3D pose and a second 3D pose included in a plurality of 3D poses are candidates for being determined as the 3D pose of the performance area of the event. In such examples, system 100 may determine a first anchor vector for the first 3D pose and a second anchor vector for the second 3D pose. The first anchor vector may be perpendicular to a surface of the performance area represented in the first 3D pose and the second anchor vector may be perpendicular to a surface of the performance area represented in the second 3D pose. To illustrate, FIG. 9 shows an exemplary implementation 900 in which there are two possible 3D poses for a performance area represented in an image of an event. As shown in FIG. 9, processed images 902-1 have similar x and y coordinates for corners 904 (e.g., corners 904-1 through 904-4) of performance area 906. However, as indicated by anchor vectors 908-1 and 908-2 the orientation of performance area 906 is different in each of processed images 902-1 and 902-2. In such an example, system 100 may select the 3D pose represented in processed image 902-2 as the 3D pose of the performance area of the event based on anchor vector 908-2 being relatively more vertical than anchor vector 908-1 when positioned within the image of the football game.

Figure 10:
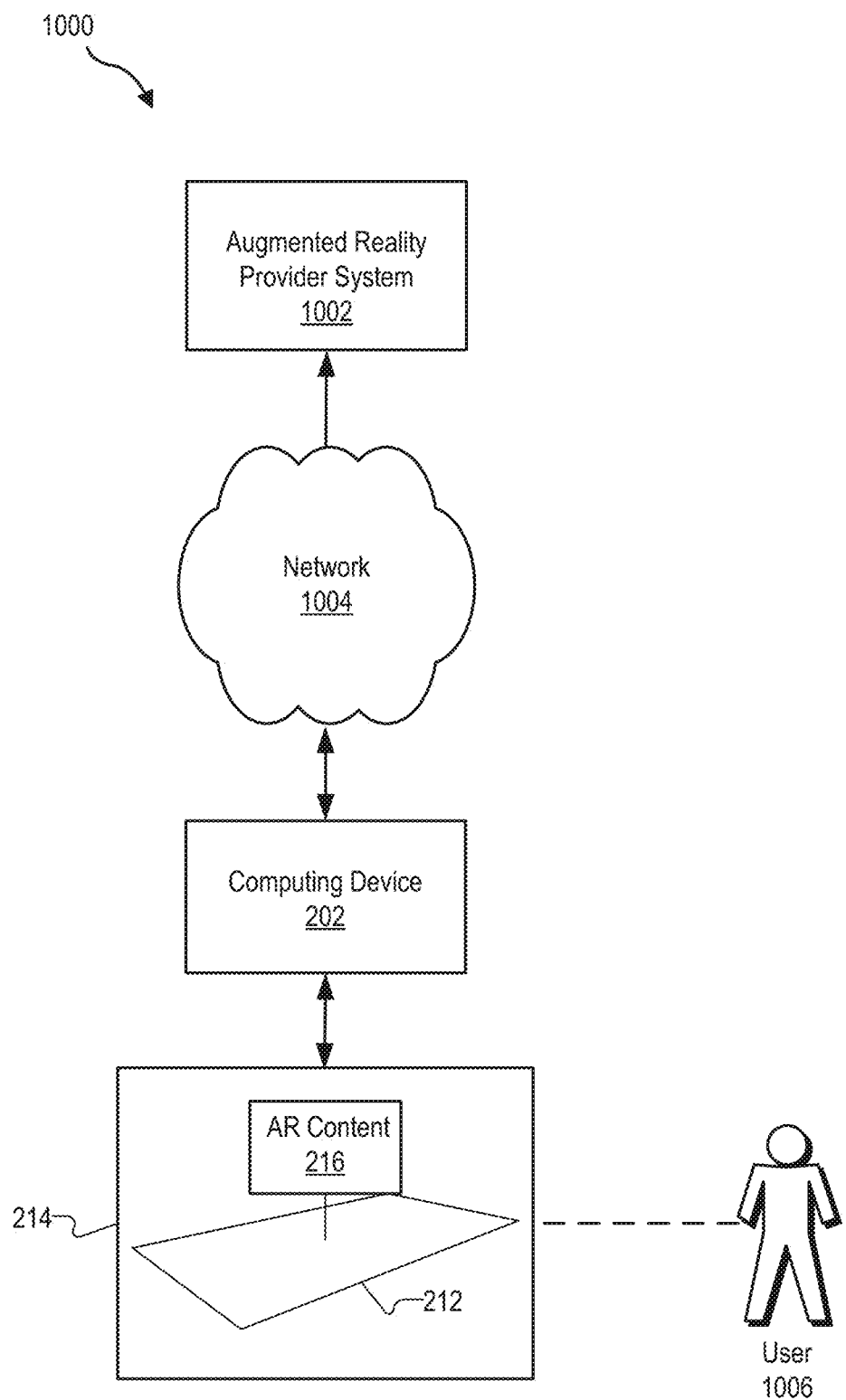
FIG. 10 illustrates another exemplary implementation of the augmented reality system of FIG. 1 according to principles described herein.

System 100 may be implemented in any suitable manner as may serve a particular application. FIG. 10 illustrates an exemplary implementation 1000 of system 100. As shown in FIG. 10, implementation 1000 may include an augmented reality provider system 1002 configured to communicate with computing device 202 by way of a network 1004. In implementation 1000, memory 102 and processor 104 of system 100 may be implemented by augmented reality provider system 1002, computing device 202, or distributed across augmented reality provider system 1002 and computing device 202. Augmented reality provider system 1002 and computing device 202 may communicate using any communication platforms and technologies suitable for transporting data and/or communication signals, including known communication technologies, devices, media, and protocols supportive of remote communications, examples of which include, but are not limited to, data transmission media, communications devices, and data transmission protocols.

Network 1004 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between computing device 202 and augmented reality provider system 1002. Communications between augmented reality provider system 1002 and computing device 202 may be transported using any one of the above-listed networks, or any combination or sub-combination of the above-listed networks. Alternatively, augmented reality provider system 1002 and computing device 202 may communicate in another way such as by one or more direct connections between augmented reality provider system 1002 and computing device 202.

Augmented reality provider system 1002 may include one or more server-side computing devices. Computing device 202 may include one or more mobile computing/processing devices such as described herein that are capable of accessing and presenting augmented reality content 216 for experiencing by a user 1006 (e.g., an end user of an augmented reality service) using the device(s).

Augmented reality provider system 1002 and/or computing device 202 may be configured to perform one or more operations to provide augmented reality content 216 for concurrent display together with image 214 that includes performance area 212. Augmented reality content 216 may include any suitable content associated with the event represented in image 214.

Figure 11:
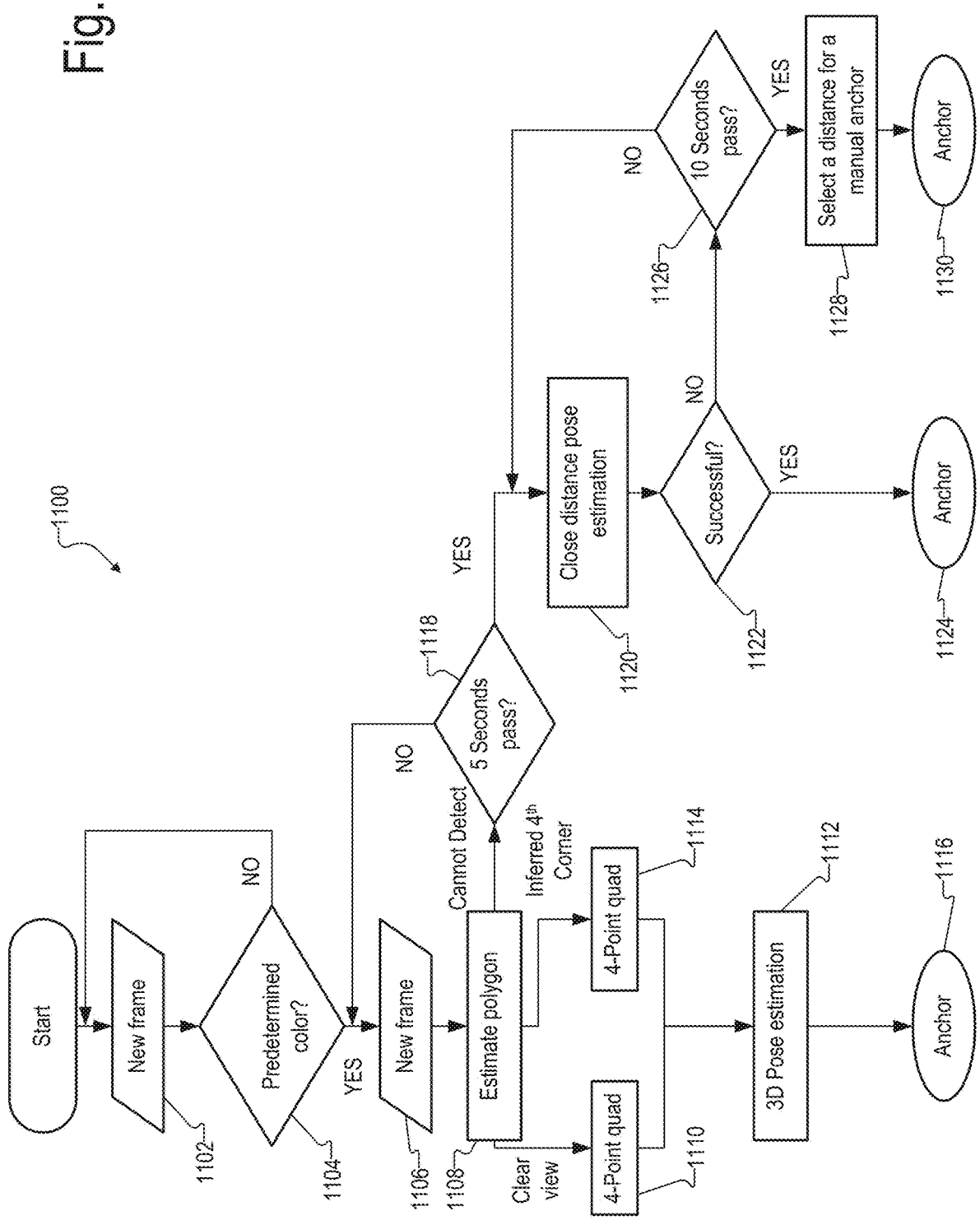
FIGS. 11-12 illustrate exemplary flow diagrams according to principles described herein.

FIG. 11 is a flow diagram 1100 that depicts exemplary operations that may be performed by system 100 to determine an anchor (e.g., an anchor vector) for augmented reality content with respect to a performance area in an image of an event. As shown in FIG. 11, system 100 obtains a new image frame of an event in operation 1102. In certain examples, operation 1102 may be preceded by a notification provided by system 100 that instructs a user to point a camera of a computing device (e.g., computing device 302) towards a performance area of an event. In certain examples, system 100 may make a deep learning model inference to identify the performance area in the new image frame. System 100 may then determine an average color (e.g., of pixels) of what the deep learning model sees as the performance area. For example, if the average color of a region in the new image frame is green, system 100 may determine that the region corresponds to a field of play of a sporting event (e.g., a football game).

In operation 1104, system 100 may determine whether the performance area identified, for example, by the deep learning model inference is a predetermined color (e.g., green). If the answer to operation 1104 is "NO," the process may return to before operation 1102. However, if the answer to operation 1104 is "Yes," the process may proceed to operation 1106 in which system 100 obtains an additional new image frame. In certain examples, system 100 may provide an indication to the user that system 100 is scanning the additional new image frame for a performance area. For example, system 100 may provide a scanning animation for display by way of a display device that informs the user that system 100 is currently scanning an image displayed by a computing device for a performance area.

System 100 may process the additional new image frame in any suitable manner such as described herein to identify the performance area. For example, system 100 may make an additional deep learning model inference to identify the performance area. Based on the additional deep learning model inference, system 100 may estimate a polygon that represents the performance area in operation 1108.

If there is a clear view of the performance area (e.g., all four corners of the performance area are viewable within the additional new frame), system 100 may use the 4-point quadrilateral in operation 1110 to estimate the 3D pose in operation 1112. If one of the corners of the polygon is not represented in the additional new frame, system 100 may infer the missing 4th corner and use the 4-point quadrilateral with the inferred missing 4th corner in operation 1114 to estimate the 3D pose of the performance area in operation 1112. Based on the 3D pose estimated in operation 1112, system 100 may determine an anchor for augmented reality content with respect to the performance area within the additional new frame in operation 1116.

If system 100 determines that it is not possible to detect the polygon in operation 1108, system 100 may determine whether a defined threshold period (e.g., five seconds) has passed in operation 1118. If the answer to operation 1118 is "NO," system 100 may return the process flow to before operation 1106.

On the other hand, if the answer in operation 1118 is "YES," system 100 may determine that it is not possible for the user to obtain a full or almost full view of the performance area. As such, system 100 may perform a close distance pose estimation of the performance area in operation 1120. System 100 may perform the close distance pose estimation in any suitable manner. For example, system 100 may estimate the close distance pose of the performance area based on known dimensions and/or a 3D point cloud of the performance area at the event. For instance, if the event corresponds to a football game, system 100 may use computer vision to detect yard lines of the football field. System 100 may then estimate the 3D pose of the football field based on the yard lines. Additionally or alternatively, system 100 may generate a 3D point cloud (e.g., an ARcore-based 3D point cloud) of the area of play that may be used to estimate the 3D pose.

In operation 1122, system 100 may determine whether operation 1120 was successful. If the answer in operation 1122 is "YES," system 100 may create an anchor in operation 1124 for augmented reality content. The anchor may be oriented with respect to the performance area based on the close distance pose estimation performed in operation 1120. On the other hand, if the answer in operation 1122 is "NO," system 100 may determine in operation 1126 whether a defined threshold period (e.g., ten seconds) has passed. If the answer in operation 1126 is "NO," system 100 may return the process flow to before operation 1120. On the other hand, if the answer to operation 1126 is "YES," system 100 may select a distance for a manual anchor in operation 1128. For example, system 100 may select a distance of 30 meters in front of a user of a computing device as a distance to place an anchor for augmented reality content in operation 1128. Based on the selected distance, system 100 may then provide an anchor for the augmented reality content in operation 1130.

Figure 12:
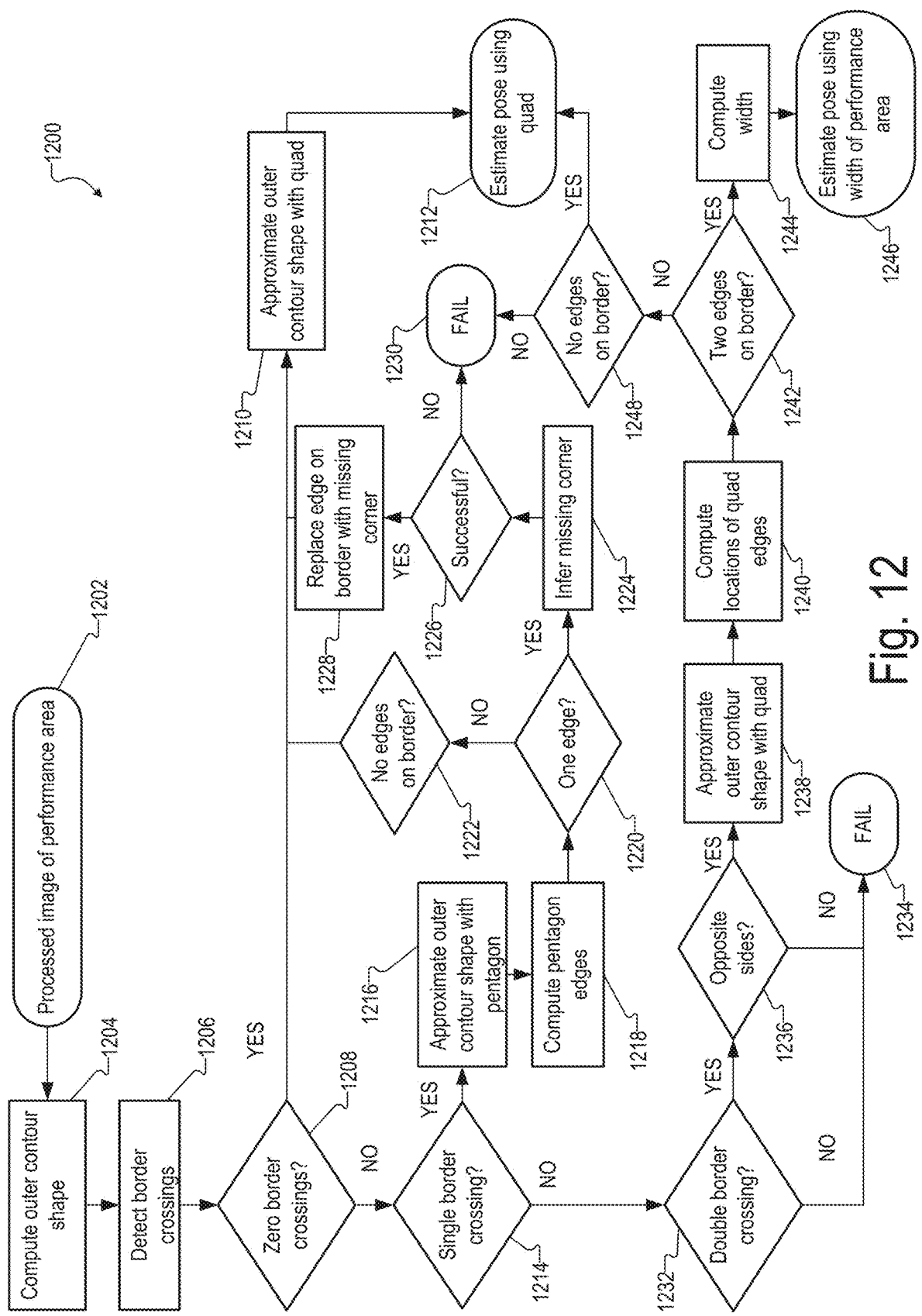

FIG. 12 is a flow diagram 1200 that depicts exemplary operations that may be performed by system 100 in determining a 3D pose of a performance area in an image of an event. As shown in FIG. 12, system 100 may generate a processed image of a performance area in operation 1202. The processed image may be processed in any suitable manner such as described herein. For example, the processed image may correspond to processed image 402-2 shown in FIG. 4.

In operation 1204, system 100 may compute an outer contour shape of the performance area in the processed image. This may be accomplished in any suitable manner, such as described herein.

In operation 1206, system 100 may detect, based on the computed outer contour shape, border crossings of the performance area where the performance area extends beyond a border of the processed image. A border crossing may be indicative of one or more corners of the performance area not currently being viewable in the processed image. As part of operation 1206, system 100 may determine the number and locations of each of the border crossings.

In operation 1208, system 100 may determine whether there are zero border crossings. If the answer in operation 1208 is "YES," system 100 may approximate the outer contour shape with a quadrilateral in operation 1210. System 100 may then estimate the 3D pose in operation 1212 using the quadrilateral determined in operation 1212.

On the other hand, if the answer in operation 1208 is "NO," system 100 may determine whether there is a single border crossing in operation 1214. If the answer to operation 1214 is "YES," system 100 may approximate the outer contour shape of the performance area with a pentagon. In operation 1218, system 100 may compute the edges of the pentagon.

In operation 1220, system 100 may determine whether one edge of the pentagon is on a border of the processed image. If the answer in operation 1220 is "NO," system 100 may determine that there are no edges on the border in operation 1222 and proceed to operation 1210. On the other hand, if the answer in operation 1220 is "YES," system 100 may infer a missing corner in operation 1224, similar to what is shown, for example, in implementation 800 depicted in FIG. 8.

In operation 1226, system 100 may determine whether the missing corner was successfully inferred. If the answer in operation 1226 is "YES," system 100 may replace the edge on the border with the missing corner in operation 1228. An example of operation 1228 is shown in processed image 802-2 shown in FIG. 8. After operation 1228, system 100 may proceed to operation 1210. On the other hand, if the answer in operation 1226 is "NO," system 100 may determine that there has been a failure to determine the 3D pose of the performance area in operation 1230.

If the answer in operation 1214 is "NO," system 100 may determine in operation 1232 whether there is a double border crossing of the performance area with respect to edges of the processed image. If the answer in operation 1232 is "NO," system 100 may determine that there has been a failure to determine the 3D pose of the performance area in operation 1234. On the other hand, if the answer in operation 1232 is "YES," system 100 may proceed to operation 1236 and determine whether the border crossings occur on opposite sides of the processed image.

If the answer in operation 1236 is "NO," system 100 may determine that there has been a failure to determine the 3D pose of the performance area in operation 1234. On the other hand, if the answer in operation 1236 is "YES," system 100 may approximate the outer contour shape representing the performance area with a quadrilateral in operation 1238.

In operation 1240, system 100 may compute the locations of the edges of the quadrilateral in the processed image.

In operation 1242, system 100 may determine whether two edges of the quadrilateral are on a border of the processed image. If the answer in operation 1242 is "YES," system may compute the width of the performance area using the known dimensions of the performance area. System 100 may then use the width to estimate the 3D pose of the performance area in operation 1246. On the other hand, if the answer in operation 1242 is "NO," system 100 may determine whether there are no edges on the border in operation 1248. If the answer in operation 1248 is "NO," system 100 may determine that there has been a failure to determine the 3D pose of the performance area in operation 1230.

If the answer in operation 1248 is "YES," system 100 may estimate the 3D pose of the performance area in operation 1212 using the quadrilateral determined in operation 1238.

Figure 13:
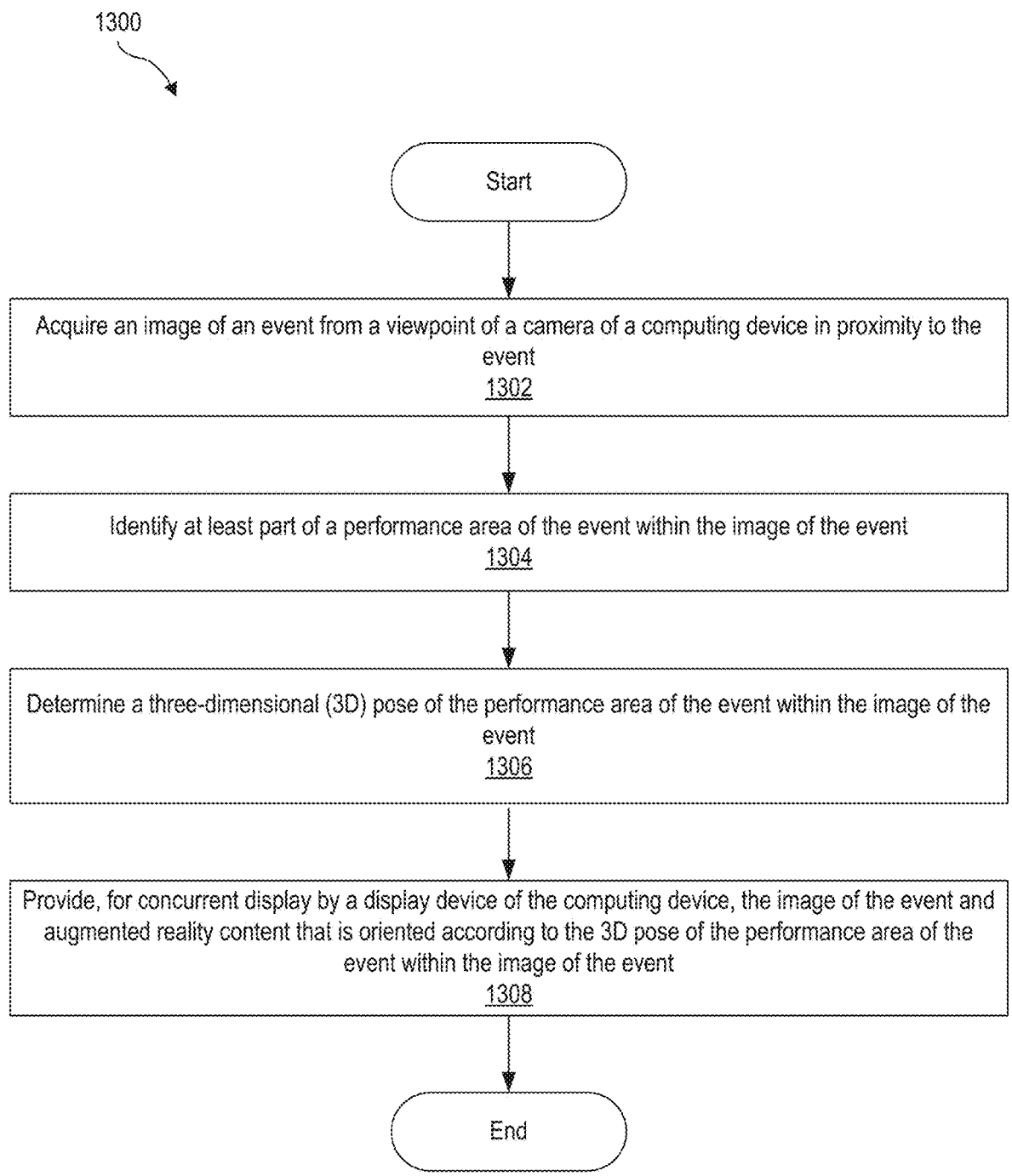
FIGS. 13-14 illustrate exemplary methods for facilitating display of augmented reality content according to principles described herein.

FIG. 13 illustrates an exemplary method for facilitating display of augmented reality content. While FIG. 13 illustrates exemplary operations according to one embodiment, other embodiments may omit, add to, reorder, and/or modify any of the operations shown in FIG. 13. One or more of the operations shown in FIG. 13 may be performed by system 100, any components included therein, and/or any implementation thereof.

In operation 1302, an augmented reality system (e.g., augmented reality system 100) may acquire an image of an event from a viewpoint of a camera of a computing device in proximity to the event. As described herein, the event may include a performance area that may, in certain examples, be for participants in the event. Operation 1302 may be performed in any of the ways described herein.

In operation 1304, the augmented reality system may identify at least part of the performance area of the event within the image of the event. Operation 1304 may be performed in any of the ways described herein.

In operation 1306, the augmented reality system may determine a 3D pose of the performance area of the event within the image of the event. Operation 1306 may be performed in any of the ways described herein.

In operation 1308, the augmented reality system may provide, for concurrent display by a display device of the computing device, the image of the event and augmented reality content that is oriented according to the 3D pose of the performance area of the event within the image of the event. Operation 1308 may be performed in any of the ways described herein.

Figure 14:
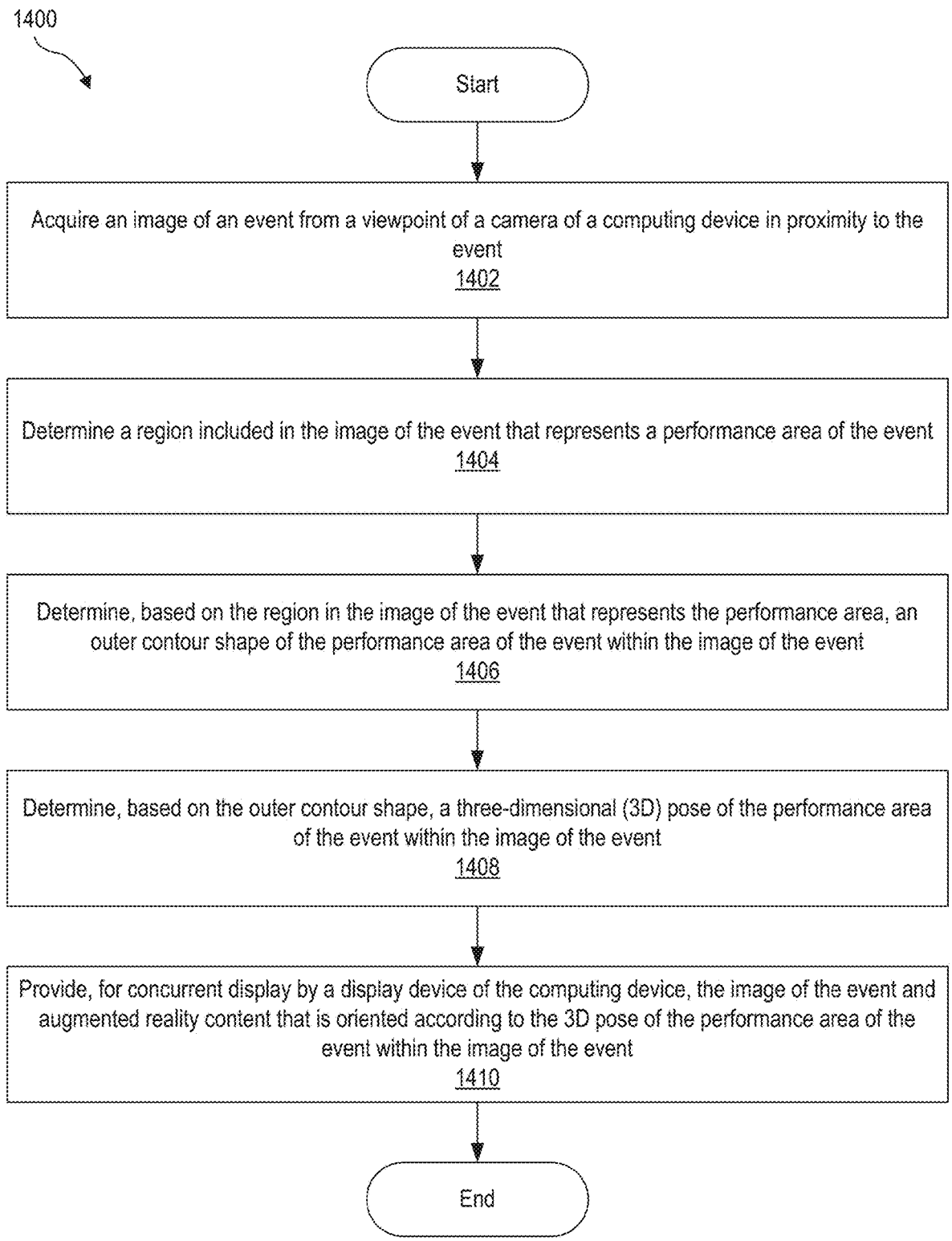

FIG. 14 illustrates another exemplary method for facilitating display of augmented reality content. While FIG. 14 illustrates exemplary operations according to one embodiment, other embodiments may omit, add to, reorder, and/or modify any of the operations shown in FIG. 14. One or more of the operations shown in FIG. 14 may be performed by system 100, any components included therein, and/or any implementation thereof.

In operation 1402, an augmented reality system (e.g., augmented reality system 100) may acquire an image of an event from a viewpoint of a camera of a computing device in proximity to the event. As described herein, the event may include a performance area that may, in certain examples, be for participants in the event. Operation 1402 may be performed in any of the ways described herein.

In operation 1404, the augmented reality system may determine a region included in the image of the event that represents the performance area of the event. Operation 1404 may be performed in any of the ways described herein.

In operation 1406, the augmented reality system may determine, based on the region in the image of the event that represents a performance area, an outer contour shape of the performance area of the event within the image of the event. Operation 1406 may be performed in any of the ways described herein.

In operation 1408, the augmented reality system may determine, based on the outer contour shape, a three-dimensional (3D) pose of the performance area of the event within the image of the event. Operation 1408 may be performed in any of the ways described herein.

In operation 1410, the augmented reality system may provide, for concurrent display by a display device of the computing device, the image of the event and augmented reality content that is oriented according to the 3D pose of the performance area of the event within the image of the event. Operation 1410 may be performed in any of the ways described herein.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory (RAM), and an optical disc (e.g., a compact disc, a digital video disc, a Blu-ray disc, etc.). Exemplary volatile storage media include, but are not limited to, RAM (e.g., dynamic RAM).

Figure 15:
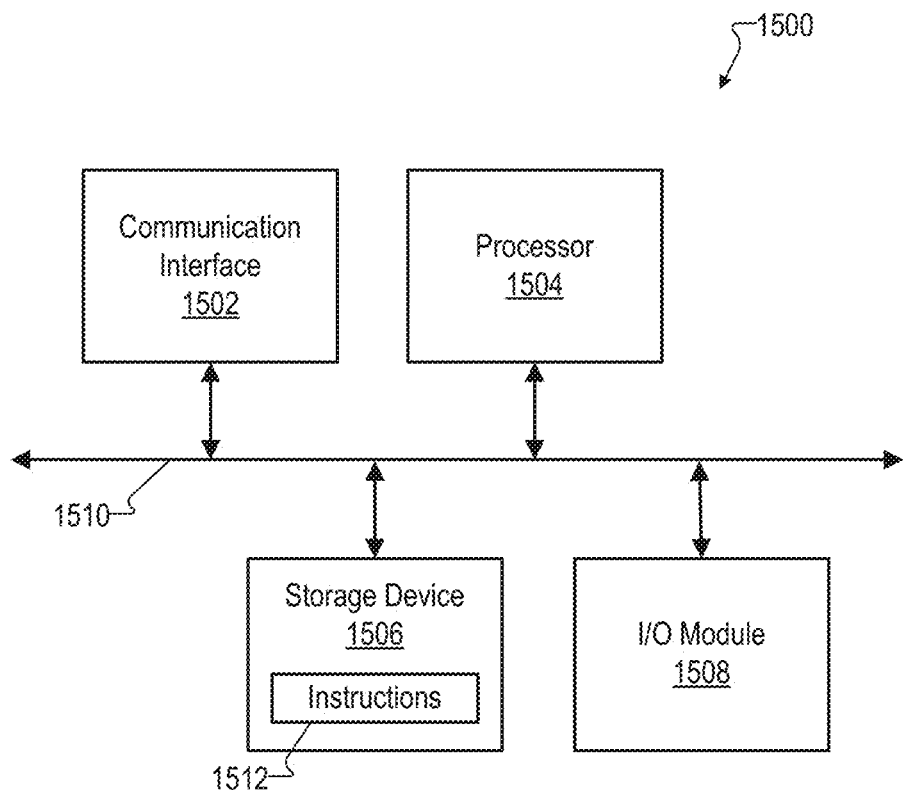
FIG. 15 illustrates an exemplary computing device according to principles described herein.

FIG. 15 illustrates an exemplary computing device 1500 that may be specifically configured to perform one or more of the processes described herein. As shown in FIG. 15, computing device 1500 may include a communication interface 1502, a processor 1504, a storage device 1506, and an input/output (I/O) module 1508 communicatively connected one to another via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data and/or interpreting, executing, and/or directing execution of one or more of the instructions, processes, and/or operations described herein. Processor 1504 may perform operations by executing computer-executable instructions 1512 (e.g., an application, software, code, and/or other executable data instance) stored in storage device 1506.

Storage device 1506 may include one or more data storage media, devices, or configurations and may employ any type, form, and combination of data storage media and/or device. For example, storage device 1506 may include, but is not limited to, any combination of the non-volatile media and/or volatile media described herein. Electronic data, including data described herein, may be temporarily and/or permanently stored in storage device 1506. For example, data representative of computer-executable instructions 1512 configured to direct processor 1504 to perform any of the operations described herein may be stored within storage device 1506. In some examples, data may be arranged in one or more databases residing within storage device 1506.

I/O module 1508 may include one or more I/O modules configured to receive user input and provide user output. One or more I/O modules may be used to receive input for a single virtual experience. I/O module 1508 may include any hardware, firmware, software, or combination thereof supportive of input and output capabilities. For example, I/O module 1508 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 1500. For example, memory 102 may be implemented by storage device 1506, and processor 104 may be implemented by processor 1504.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    acquiring, by an augmented reality system, an image of an event from a viewpoint of a camera of a computing device in proximity to the event, the event including a performance area;
    identifying, by the augmented reality system, at least part of the performance area of the event within the image of the event;
    determining, by the augmented reality system, a three-dimensional (3D) pose of the performance area of the event within the image of the event;
    determining, by the augmented reality system and based on the 3D pose of the performance area, an anchor vector that is perpendicular to the performance area; and
    providing, by the augmented reality system for concurrent display by a display device of the computing device, the image of the event and augmented reality content that is oriented with respect to the anchor vector and according to the 3D pose of the performance area of the event within the image of the event.

2. The method of claim 1, wherein the identifying of the at least part of the performance area includes determining an outer contour shape of the performance area of the event within the image of the event.

3. The method of claim 2, wherein:
    the identifying of the at least part of the performance area further includes determining, based on the outer contour shape, that the performance area of the event is completely viewable within the image of the event; and
    the determining of the 3D pose of the performance area of the event is based on the outer contour shape indicating that the performance area is completely viewable within the image of the event.

4. The method of claim 2, wherein:
    the identifying of the at least part of the performance area further includes:
        determining, based on the outer contour shape, a location where the performance area crosses a border of the image of the event; and
        determining a location of a corner of the performance area based on the location where the outer contour shape of the performance area crosses the border of the image; and
    the determining of the 3D pose of the performance area of the event is based on the outer contour shape and the location of the corner of the performance area.

5. The method of claim 2, wherein:
    the identifying of the at least part of the performance area further includes determining, based on the outer contour shape of the performance area, that each corner of the performance area of the event is outside of the image of the event; and
    the augmented reality content is provided for display with the image of the event based on known dimensions of the performance area of the event.

6. The method of claim 2, wherein the identifying of the at least part of the performance area further includes:
    comparing the outer contour shape of the performance area of the event to a plurality of known outer contour shapes of the performance area of the event; and
    determining that the outer contour shape corresponds to a known outer contour shape from the plurality of known outer contour shapes when a degree of similarity between the outer contour shape and the known outer contour shape satisfies a predefined threshold.

7. The method of claim 1, wherein:
    the determining of the 3D pose of the performance area of the event includes determining that a first 3D pose and a second 3D pose included in a plurality of 3D poses are candidates for being determined as the 3D pose of the performance area of the event;
    the determining of the anchor vector includes determining a first anchor vector for the first 3D pose and a second anchor vector for the second 3D pose, the first anchor vector being perpendicular to a surface of the performance area represented in the first 3D pose and the second anchor vector being perpendicular to a surface of the performance area represented in the second 3D pose; and
    the determining of the 3D pose of the performance area of the event further includes selecting the first 3D pose as the 3D pose of the performance area of the event based on the first anchor vector being relatively more vertical than the second anchor vector when positioned within the image of the event.

8. The method of claim 7, wherein the augmented reality content is oriented with respect to the first anchor vector.

9. The method of claim 8, wherein the first anchor vector is provided at a center of the performance area of the event within the image of the event.

10. The method of claim 1, wherein an orientation of the augmented reality content is fixed in relation to the performance area of the event regardless of a change in viewing angle of the camera of the computing device.

11. The method of claim 1, further comprising determining, by the augmented reality system, a center of the performance area within the image of the event,
    wherein the providing of the image and the augmented reality content for concurrent display includes providing the augmented reality content at the center of the performance area within the image of the event.

12. The method of claim 1, wherein the augmented reality content is associated with one or more participants in the event.

13. A method comprising:
   acquiring, by an augmented reality system, an image of an event from a viewpoint of a camera of a computing device in proximity to the event, the event including a performance area;
   determining, by the augmented reality system, a region included in the image of the event that represents the performance area of the event;
   determining, by the augmented reality system based on the region in the image of the event that represents a performance area, an outer contour shape of the performance area of the event within the image of the event;
   determining, by the augmented reality system based on the outer contour shape, a three-dimensional (3D) pose of the performance area of the event within the image of the event;
   determining, based on the 3D pose of the performance area, an anchor vector that is perpendicular to the performance area; and
   providing, by the augmented reality system for concurrent display by a display device of the computing device, the image of the event and augmented reality content that is oriented with respect to the anchor vector and according to the 3D pose of the performance area of the event within the image of the event.

14. The method of claim 13, wherein the determining of the outer contour shape includes:
   determining that at least one corner of the performance area of the event is not within the image of the event; and
   determining a location of the at least one corner of the performance area of the event.

15. The method of claim 13, wherein the determining of the first region in the image of the event includes determining an average color of pixels included in the image of the event.

16. A system comprising:
   a memory that stores instructions;
   a processor communicatively coupled to the memory and configured to execute the instructions to:
      acquire an image of an event from a viewpoint of a camera of a computing device in proximity to the event, the event including a performance area;
      identify at least part of the performance area of the event within the image of the event;
      determine a three-dimensional (3D) pose of the performance area of the event within the image of the event;
      determine, based on the 3D pose of the performance area, an anchor vector that is perpendicular to the performance area; and
      provide, for concurrent display by a display device of the computing device, the image of the event and augmented reality content that is oriented with respect to the anchor vector and according to the 3D pose of the performance area of the event within the image of the event.

17. The system of claim 16, wherein the identifying of the at least part of the performance area includes determining an outer contour shape of the performance area of the event within the image of the event.

18. The system of claim 16, wherein:
   the processor is further configured to execute the instructions to determine, based on the 3D pose of the performance area of the event, a center of the performance area of the event; and
   the augmented reality content is provided for display at the center of the performance area of the event within the image of the event.

19. The system of claim 16, wherein an orientation of the augmented reality content is fixed in relation to the performance area of the event regardless of a change in viewing angle of the camera of the computing device.

* * * * *